May 27, 1941.    K. K. PROBST    2,243,286
FLEXIBLE LINK
Filed Jan. 20, 1939

INVENTOR.
Karl K. Probst
BY
J. Windsor Davis
ATTORNEY.

Patented May 27, 1941

2,243,286

UNITED STATES PATENT OFFICE 2,243,286

FLEXIBLE LINK

Karl K. Probst, Detroit, Mich., assignor to Karl K. Probst and J. H. Shoemaker as joint trustees for Probst Shoemaker-Merrill Company, a joint venture company, Detroit, Mich.

Application January 20, 1939, Serial No. 251,941

2 Claims. (Cl. 287—85)

This invention relates to flexible connecting links or tie rods for articulately connecting or coupling machine elements, levers, cranks and the like, for the purpose of uniting the same or for transmitting motion or power from one element to another.

In the control systems of automotive vehicles link members are used quite extensively, in addition to their use in conjunction with the control of or as a part of accessories. Examples of such uses might be the throttle controls or the windshield wiper actuating means, motor mounting stays, shock absorber links, pedal linkages, etc., where motion is transferred to and from shafts, etc., by cranks or their equivalents connected by links. In some cases the axes of two connected cranks are disposed at an angle to each other and the planes through which the cranks swing or rotate are angularly related so that the link which connects them must include a universal joint action.

The principal object of the invention is to provide a link including connecting means at the ends thereof which is capable of universal joint action.

Another object is to provide a link with connecting means of this character which is free from lubrication problems, which will not rattle, and which will not stick.

Another object is to provide a link with connecting means embodying a self-lubricating bushing adapted to receive a pin on a crank or its equivalent, an elastic bushing, of material such as rubber, stretched over and having firm contact with the metal bushing, and a loop portion on the link received on the elastic bushing. This arrangement includes several advantages in that the pin after being slipped through the self lubricating bushing may be riveted or otherwise secured to the crank or arm upon which it is to be mounted. The elastic or rubber bushing is then stretched over the head of the pin and makes firm contact with the metal bushing. In final assembly it is only necessary to slip the loop of the link over the elastic bushing and into a peripheral groove therein. No cotter pins, stampings or other means are necessary for fastening, with the self-lubricating bushing, rattles and sticking are eliminated, and by varying the mass and elasticity of the rubber bushing the link may be designed for efficient operation in the presence of varying universal joint action requirements.

Another object is to provide a link with connecting means embodying shock absorbing and vibration absorbing or damping elements. In this respect the elastic material interposed between the self-lubricating bushing and the loop in the link member, in addition to providing a universal joint action, may be used advantageously in cases where no universal joint action is required. Rubber, for example, is known to have the ability to absorb certain vibrations, making possible its use as a vibration damping means, and its natural resiliency makes possible its use as a shock absorbing or cushioning means.

Other objects and advantages will become more fully apparent as reference is had to the accompanying drawing wherein my invention is illustrated and in which.

Figure 1:
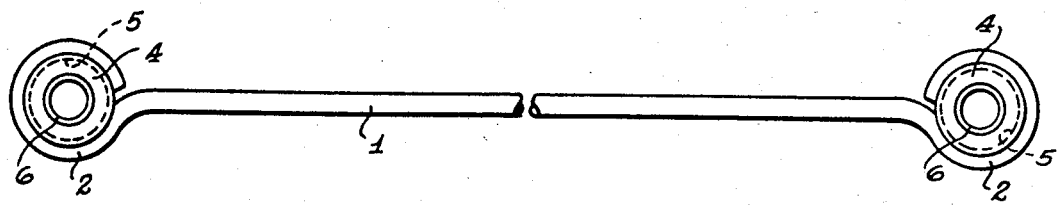
Fig. 1 is an elevation of the link.
Figure 2:
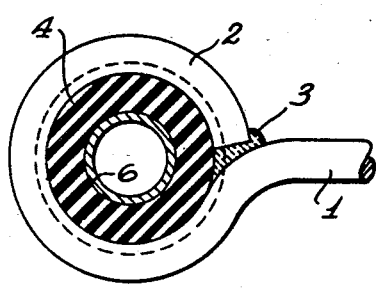
Fig. 2 is an enlarged longitudinal section.

The link 1 comprises a length of tempered steel wire bent to provide loops 2 at the ends thereof. In some cases the natural resistance to bending of the wire is relied upon to maintain the loops 2 closed as is the case in the illustration in Fig. 1, while in other cases the free end of the wire is welded to the main portion as indicated at 3 in Fig. 2.

The loop 2 encircles an elastic bushing 4, preferably formed of rubber, and having a preformed groove 5 into which it fits. The elastic bushing 4 is stretched over a self-lubricating metal bushing 6, and due to its stretched condition maintains firm contact therewith.

In assembly, the self-lubricating bushing 6 is placed on a pin 7 having a head 8 thereon. The pin 7 is then riveted or otherwise secured to a crank or equivalent element 9, and the rubber bushing 4 is then stretched over the head 8 and placed in contact with the bushing 6. The final step consists in slipping the wire loop over the rubber.

Figure 3:
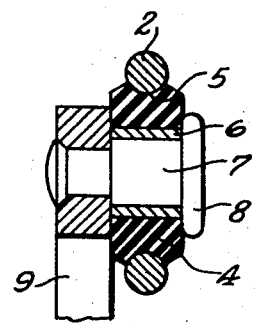
Fig. 3 is a transverse section illustrating the assembly of the link on a pin.
Figure 4:
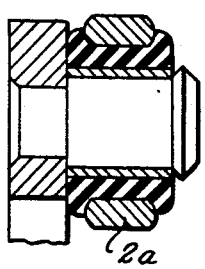
Fig. 4 is a section, similar to Fig. 3, illustrating connecting means designed for comparatively heavy loading.

As shown in Fig. 3 the wire 1 may be formed of round stock, or as shown in Fig. 4 it may be flattened to provide greater bearing surface between the loop 2a and the elastic bushing 4a in cases where the link is to be subjected to heavier loads.

In either case the elastic material is capable of deflection to permit universal joint action, it absorbs and dampens certain vibrations, and is capable of absorbing or cushioning shocks.

The wire link body in some cases may be formed to incorporate a high degree of rigidity, and in other cases may be formed to incorporate the deflecting characteristics of a spring, depending upon its intended use.

Although specific embodiments of the invention are illustrated and described, it will be understood that various changes may be made within the scope of the appended claims without departing from the spirit of the invention, and such changes are contemplated.

What is claimed is:

1. A link and universal joint combination comprising an elongate body, a rigid bushing, an elastic bushing encircling said rigid bushing in firm contact therewith, and a loop on the end of said body tightly encircling said elastic bushing, said elastic bushing having a preformed groove for the reception of said loop, and said elastic bushing having the region adjacent the groove and for a substantial distance inwardly thereof unconfined to enable substantial lateral bending deflection thereof.

2. A link comprising an elongate wire-like body, a rigid hollow bushing, an elastic bushing encircling said rigid bushing in firm contact therewith, said body being bent at its end to form a loop and having said loop tightly encircling said elastic bushing, said loop portion being substantially circular in cross section and being partially imbedded in the elastic bushing.

KARL K. PROBST.